United States Patent
Mullenaux

(10) Patent No.: US 10,994,978 B1
(45) Date of Patent: May 4, 2021

(54) VEHICULAR WATER-DISPENSING SYSTEM

(71) Applicant: Thomas Mullenaux, San Pedro, CA (US)

(72) Inventor: Thomas Mullenaux, San Pedro, CA (US)

( * ) Notice: Subject to any disclaimer, the term of this patent is extended or adjusted under 35 U.S.C. 154(b) by 0 days.

(21) Appl. No.: 16/813,944

(22) Filed: Mar. 10, 2020

Related U.S. Application Data

(63) Continuation-in-part of application No. 16/695,416, filed on Nov. 26, 2019.

(51) Int. Cl.
| | |
|---|---|
| *B67D 1/00* | (2006.01) |
| *B67D 1/08* | (2006.01) |
| *B67D 1/12* | (2006.01) |
| *B60N 3/18* | (2006.01) |

(52) U.S. Cl.
CPC .............. *B67D 1/0011* (2013.01); *B60N 3/18* (2013.01); *B67D 1/0085* (2013.01); *B67D 1/0855* (2013.01); *B67D 1/1211* (2013.01); *B67D 1/1231* (2013.01); *B67D 2001/0093* (2013.01); *B67D 2210/00065* (2013.01); *B67D 2210/00136* (2013.01)

(58) Field of Classification Search
CPC .. B67D 1/0004; B67D 1/0005; B67D 1/0007; B67D 1/0085; B67D 1/0888; B67D 1/1218
See application file for complete search history.

(56) References Cited

U.S. PATENT DOCUMENTS

| | | | | |
|---|---|---|---|---|
| 3,745,596 A | ‡ | 7/1973 | Copeland ............... | A47C 17/86 5/308 |
| 4,140,150 A | * | 2/1979 | Rundell .................. | B60N 3/18 137/340 |
| 4,274,566 A | * | 6/1981 | Rowe ........................ | B62J 9/22 224/414 |
| 4,842,724 A | * | 6/1989 | Bray ...................... | B01D 61/08 210/104 |
| 5,090,075 A | ‡ | 2/1992 | Larson ................. | A47C 27/085 141/11 |

(Continued)

FOREIGN PATENT DOCUMENTS

FR 2595678 A1 * 9/1987 ............... B60N 3/16

*Primary Examiner* — Kevin F Murphy
(74) *Attorney, Agent, or Firm* — Kyle A. Fletcher, Esq.

(57) ABSTRACT

The vehicular water-dispensing system is an enhancement to non-provisional application U.S. Ser. No. 16/695,416. Application U.S. Ser. No. 16/695,416 comprises a first retractable hose and a second retractable hose. The vehicular water-dispensing system comprises a logic module, a solenoid valve, a flow meter, and a plurality of vessel structures The logic module, the solenoid valve, and the flow meter controls the flow of drinking water into the plurality of vessel structures. The flow meter measures the flow of drinking water discharged from the solenoid valve. The logic module, the solenoid valve, and the flow meter are electrically connected to form a feedback loop that controls the flow of drinking water through the solenoid valve. Each of the plurality of vessel structures is a mechanical structure that contains the drinking water in preparation for consumption. The plurality of vessel structures automatically refills the drinking water after the drinking water has been consumed.

20 Claims, 6 Drawing Sheets

(56) References Cited

U.S. PATENT DOCUMENTS

| | | | | |
|---|---|---|---|---|
| D342,393 | S ‡ | 12/1993 | Cephas | D6/384 |
| 5,271,837 | A ‡ | 12/1993 | Discepolo | B01J 39/04 |
| | | | | 210/28 |
| 6,513,343 | B2 ‡ | 2/2003 | Pahl | A47J 41/0061 |
| | | | | 62/371 |
| 6,851,275 | B2 * | 2/2005 | Kreutzmann | A42B 3/048 |
| | | | | 62/457.2 |
| 7,077,290 | B2 * | 7/2006 | Bethuy | B67D 1/0032 |
| | | | | 222/129.1 |
| 8,899,281 | B2 | 12/2014 | Russell | |
| 2016/0231029 | A1 ‡ | 8/2016 | Pan | A47B 79/00 |

\* cited by examiner
‡ imported from a related application

VEHICULAR WATER-DISPENSING SYSTEM

CROSS REFERENCES TO RELATED APPLICATIONS

This non-provisional application is a continuation-in-part application filed under 37 CFR 1.53(b) that claims the benefit of United States 35 USC 120 from non-provisional application U.S. Ser. No. 16/695,416 filed on Nov. 26, 2019 by the inventor: Thomas Mullenaux of San Pedro, Calif. This non-provisional application incorporates non-provisional application U.S. Ser. No. 16/695,416 in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of passenger vehicles transportation including the transfer of liquids not otherwise provided for, more specifically, a detail for an apparatus for dispensing a beverage on draught. (B67D1/0869)

SUMMARY OF RELATED CROSS-REFERENCED APPLICATIONS

This non-provisional application is a continuation-in-part application filed under 37 CFR 1.53(b) that claims the benefit of United States 35 USC 120 from non-provisional application U.S. Ser. No. 16/695,416 filed on Nov. 26, 2019 by the inventor: Thomas Mullenaux of San Pedro, Calif. This non-provisional application incorporates non-provisional application U.S. Ser. No. 16/695,416 in its entirety. The non-provisional application U.S. Ser. No. 16/695,416 is itself a continuation-in-part application filed under 37 CFR 1.53(b) that claimed the benefit of United States 35 USC 120 from non-provisional application U.S. Ser. No. 16/149,322 filed on Oct. 2, 2018 by the inventor: Thomas Mullenaux of San Pedro, Calif. This non-provisional application incorporates non-provisional application U.S. Ser. No. 16/149,322 in its entirety. The non-provisional application U.S. Ser. No. 16/149,322 is itself a continuation-in-part application filed under 37 CFR 1.53(b) that claimed the benefit of United States 35 USC 120 from non-provisional application U.S. Ser. No. 16/140,643 also filed by the inventor: Thomas Mullenaux of San Pedro, Calif.

The present disclosure will only reference the elements of the non-provisional application U.S. Ser. No. 16/695,416 that are relevant to the innovations disclosed within this application. This is done for purposes of simplicity and clarity of exposition. The applicant notes that this disclosure incorporates non-provisional application U.S. Ser. No. 16/695,416 in its entirety into this application. The fact that any specific innovation selected from the one or more innovations disclosed within U.S. Ser. No. 16/695,416 is not addressed in this application should not be interpreted as an indication of defect in the above referenced patent.

Within this disclosure, the non-provisional application U.S. Ser. No. 16/695,416 will also be referred to as the prior disclosure.

A summary of the disclosures contained within the prior disclosure that are relevant to the present disclosure is provided below. This summary is provided for clarity and convenience and is not intended to fully represent or reflect the disclosures contained within the prior disclosure. If a discrepancy occurs between this summary and the prior disclosure, the prior disclosure should be considered correct and this summary should be considered in error.

The prior disclosure discloses a water dispensing system. The water dispensing system is configured for use with a vehicle 900. The prior disclosure is adapted to dispense drinking water 106 to the occupants of the vehicle 900. The water dispensing system of the prior disclosure is fully contained within the vehicle 900. The water dispensing system of the prior disclosure is powered by the electric system within the vehicle 900. The prior disclosure comprises a water storage reservoir 430, a distribution filter, a distribution pump 450, a distribution valve, a first retractable hose 420, a second retractable hose 425, a first mouthpiece 410, and a second mouthpiece 415.

The water storage reservoir 430 is a container used to store drinking water 106 for distribution to occupants of the vehicle 900. The drinking water 106 stored in the water storage reservoir 430 is refillable. The distribution pump 450 is a mechanical device that generates a pressure differential which is used for transporting the drinking water 106 from the water distribution reservoir 430 and through the distribution filter to the distribution valve. The distribution valve controls the flow of the drinking water 106 into the first retractable hose 420 and the second retractable hose 425.

The first retractable hose 420 transports the drinking water 106 from the distribution valve to the first mouthpiece 410. The second retractable hose 425 transports the drinking water 106 from the distribution valve to the second mouthpiece 415. The first mouthpiece 420 is a mechanical port that allows an individual to draw drinking water 106 from the water dispensing system for consumption. The second mouthpiece 425 is a mechanical port that allows an individual to draw drinking water 106 from the water dispensing system for consumption.

The prior disclosure further captures condensate water from the atmosphere, processes the condensate water into drinking water 106 and transports the drinking water 106 into the water storage reservoir 430. The prior disclosure further comprises a water generation system, a condensate pump, a condensate filter, and a power circuit. The power circuit is an independently powered system that can operate independently from the vehicle 900 electric system. The water generation system, the condensate pump, and the condensate filter are fluidically connected.

SUMMARY OF INVENTION

The vehicular water-dispensing system is an enhancement to the prior disclosure described in the Background section of this disclosure. The prior disclosure comprises a water storage reservoir, a distribution pump, a first retractable hose, a second retractable hose, a first mouthpiece, and a second mouth piece. The prior disclosure is described in the background section of this disclosure.

The vehicular water-dispensing system comprises a logic module, a solenoid valve, a flow meter, and a plurality of vessel structures. The solenoid valve and the logic module control the flow of drinking water from the water distribution pump and the water storage reservoir to the plurality of vessel structures. The flow meter measures the flow of drinking water discharged from the solenoid valve. The logic module, the solenoid valve, and the flow meter are electrically connected to form a feedback loop that controls the flow of drinking water through the solenoid valve into the plurality of vessel structures. The logic module, the solenoid valve, and the flow meter controls the flow of drinking water into the plurality of vessel structures.

The plurality of vessel structures replaces a structure selected from the group consisting of: a) the first mouthpiece; and, b) the second mouthpiece. Each of the plurality of vessel structures is a mechanical structure that contains the drinking water in preparation for consumption. The plurality of vessel structures automatically refills the drinking water after the drinking water has been consumed.

These together with additional objects, features and advantages of the vehicular water-dispensing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular water-dispensing system in detail, it is to be understood that the vehicular water-dispensing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular water-dispensing system.

It is therefore important that the claims be regarded as including such equivalent construction insofar as they do not depart from the spirit and scope of the vehicular water-dispensing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
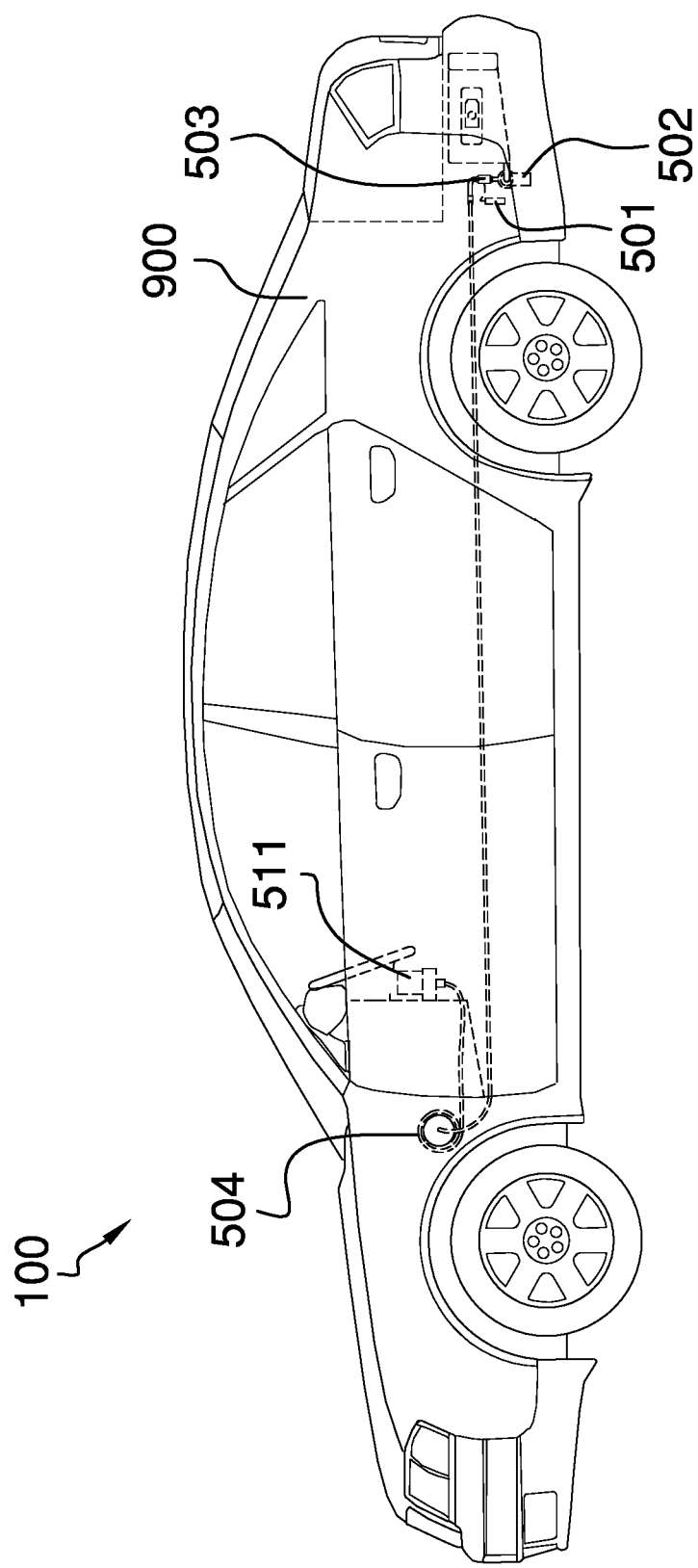
FIG. 1 is a side view of an embodiment of the disclosure.
Figure 2:
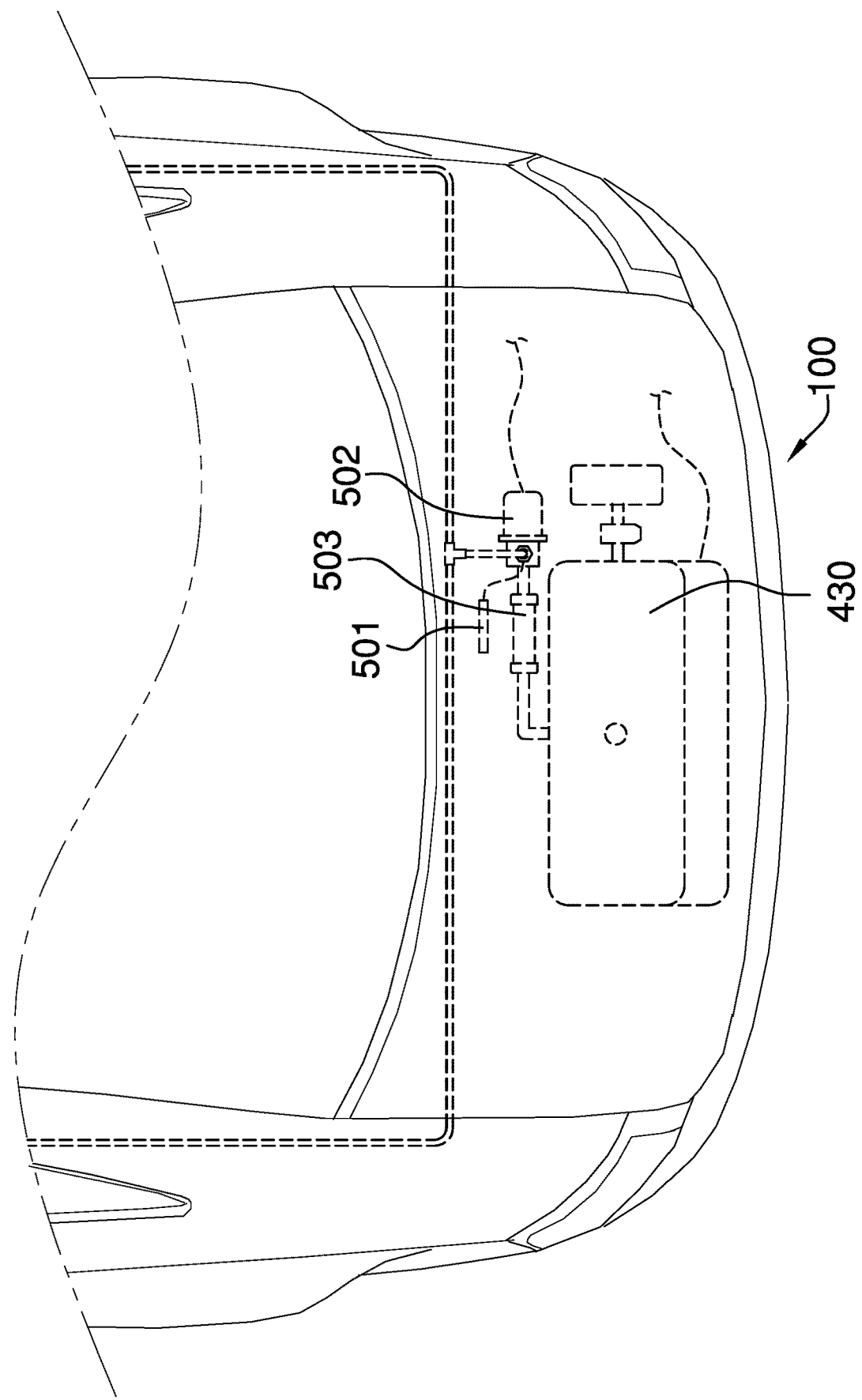
FIG. 2 is a top view of an embodiment of the disclosure.
Figure 3:
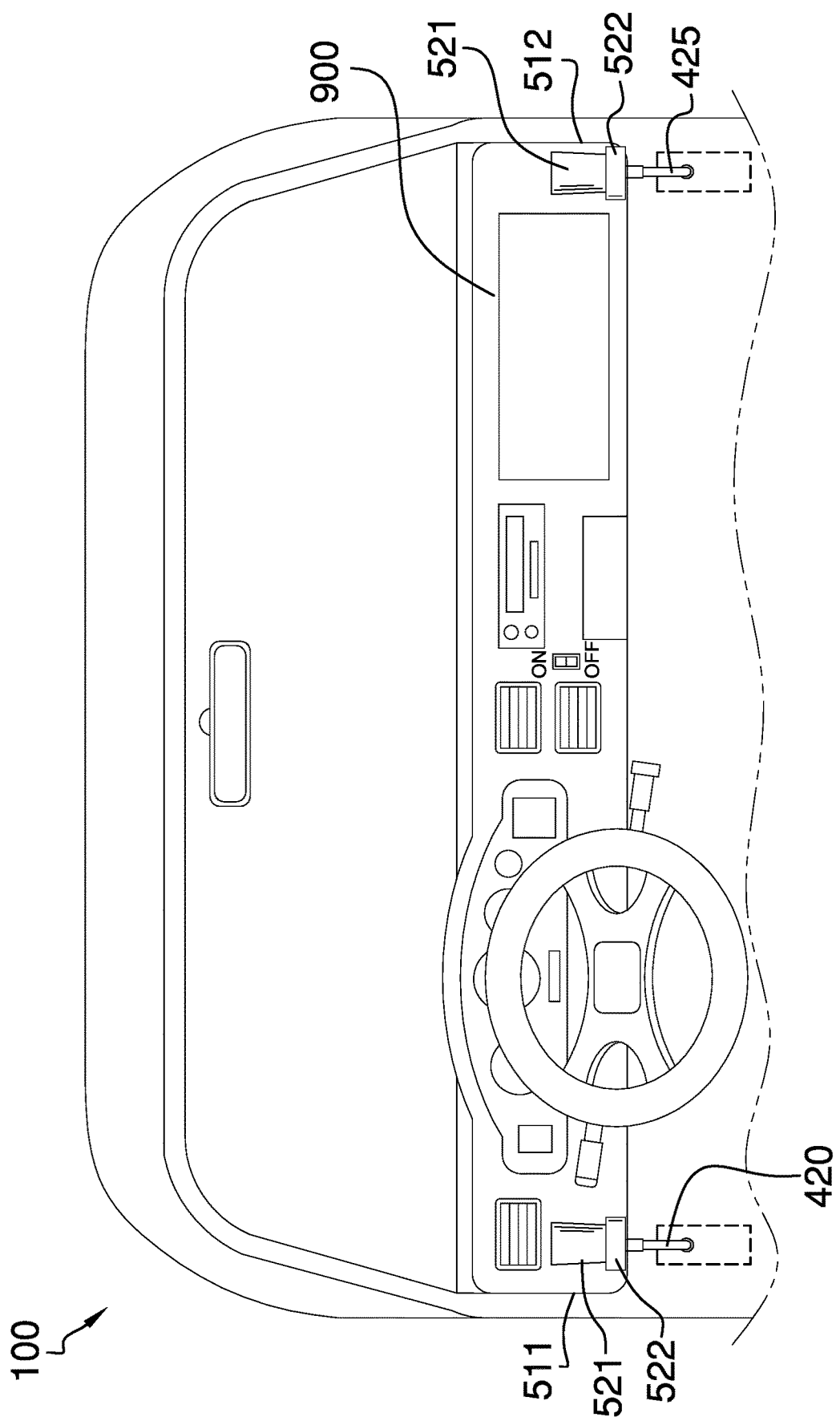
FIG. 3 is a front view of an embodiment of the disclosure.
Figure 4:
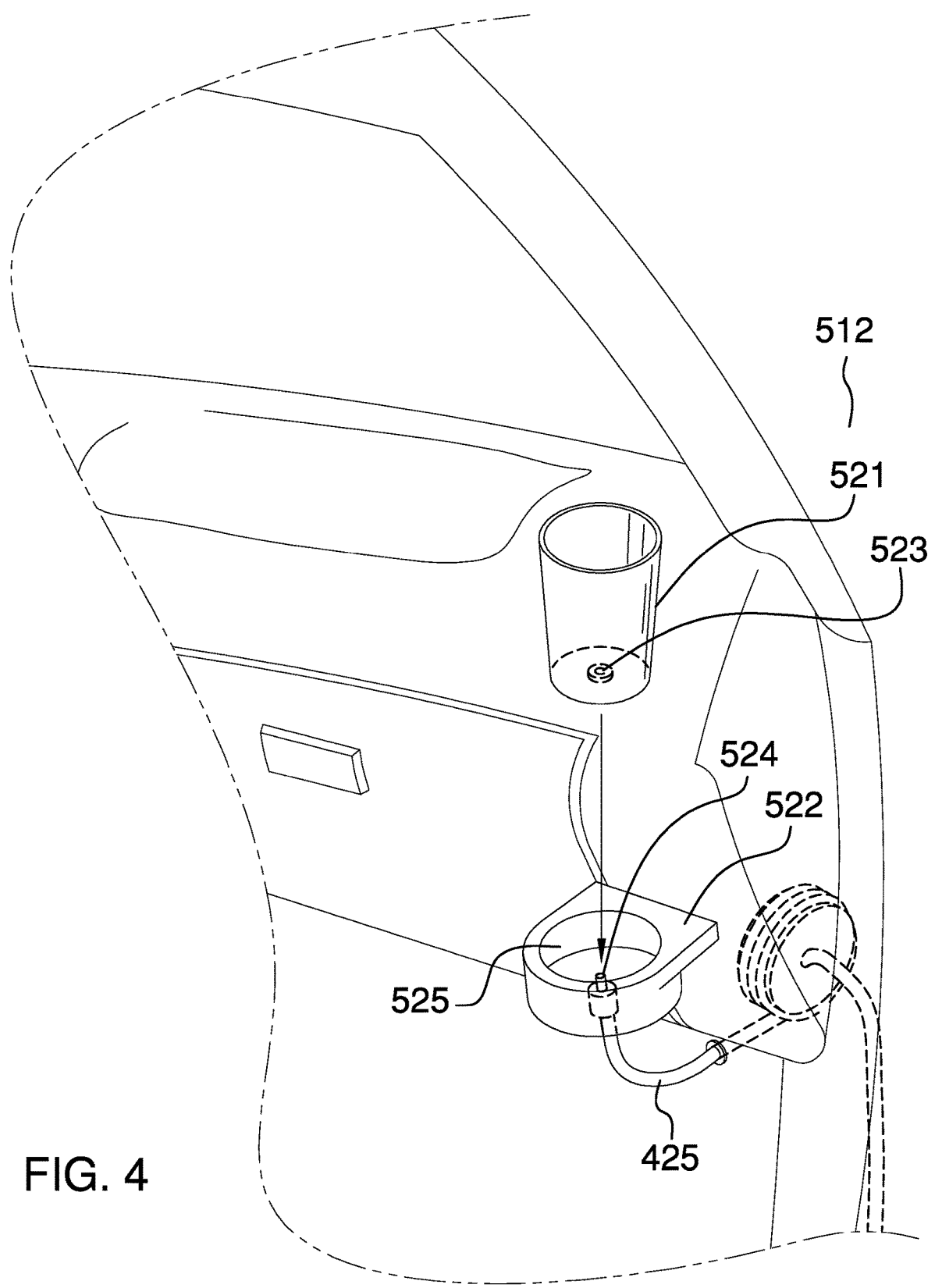
FIG. 4 is a detail view of an embodiment of the disclosure.

Detailed reference will now be made to one or more potential embodiments of the disclosure, which are illustrated in FIGS. 1 through 4.

This non-provisional application is a continuation-in-part application filed under 37 CFR 1.53(b) that claims the benefit of United States 35 USC 120 from non-provisional application U.S. Ser. No. 16/695,416 filed on Nov. 26, 2019 by the inventor: Thomas Mullenaux of San Pedro, Calif. This non-provisional application incorporates non-provisional application U.S. Ser. No. 16/695,416 in its entirety. The non-provisional application U.S. Ser. No. 16/695,416 is itself a continuation-in-part application filed under 37 CFR 1.53(b) that claimed the benefit of United States 35 USC 120 from non-provisional application U.S. Ser. No. 16/149,322 filed on Oct. 2, 2018 by the inventor: Thomas Mullenaux of San Pedro, Calif. This non-provisional application incorporates non-provisional application U.S. Ser. No. 16/149,322 in its entirety. The non-provisional application U.S. Ser. No. 16/149,322 is itself a continuation-in-part application filed under 37 CFR 1.53(b) that claimed the benefit of United States 35 USC 120 from non-provisional application U.S. Ser. No. 16/140,643 also filed by the inventor: Thomas Mullenaux of San Pedro, Calif.

The present disclosure will only reference the elements of the non-provisional application U.S. Ser. No. 16/695,416 that are relevant to the innovations disclosed within this application. This is done for purposes of simplicity and clarity of exposition. The applicant notes that this disclosure incorporates non-provisional application U.S. Ser. No. 16/695,416 in its entirety into this application. The fact that any specific innovation selected from the one or more innovations disclosed within U.S. Ser. No. 16/695,416 is not addressed in this application should not be interpreted as an indication of defect in the above referenced patent.

The vehicular water-dispensing system 100 (hereinafter invention) is an enhancement to the prior disclosure described in the Background section of this disclosure. The prior disclosure comprises a water storage reservoir 430, a distribution pump 450, a first retractable hose 420, a second retractable hose 425, a first mouthpiece 410, and a second mouth piece 415. The prior disclosure is described in the background section of this disclosure.

The invention 100 comprises a logic module 501, a solenoid valve 502, a flow meter 503, and a plurality of vessel structures 504. The solenoid valve 502 and the logic module 501 control the flow of a drinking water 106 from the water distribution pump 450 and the water storage reservoir 430 to the plurality of vessel structures 504. The flow meter 503 measures the flow of drinking water 106 discharged from the solenoid valve 502. The logic module 501, the solenoid valve 502, and the flow meter 503 are electrically connected to form a feedback loop that controls the flow of drinking water 106 through solenoid valve 502 into the plurality of vessel structures 504. The logic module 501, the solenoid valve 502, and the flow meter 503 control the flow of drinking water 106 into the plurality of vessel structures 504.

The plurality of vessel structures 504 replaces a mouthpiece selected from the group consisting of: a) the first mouthpiece 410; and, b) the second mouthpiece 415. Each of the plurality of vessel structures 504 is a mechanical structure that contains the drinking water 106 in preparation for consumption. The plurality of vessel structures 504 automatically refills the drinking water 106 after the drinking water 106 has been consumed.

The term drinking water 106 is defined elsewhere in this disclosure. The first mouthpiece 410 is described in the Background section of this disclosure. The second mouthpiece 415 is described in the Background section of this disclosure. The first retractable hose 420 is described in the Background section of this disclosure. The second retractable hose 425 is described in the Background section of this disclosure. The water storage reservoir 430 is described in the Background section of this disclosure. The distribution pump 450 is described in the Background section of this disclosure. The vehicle 900 is described in the Background section of this disclosure.

The invention 100 further comprises a water storage reservoir 430 and a distribution pump 450. The logic module 501, the solenoid valve 502, and the flow meter 503 are electrically connected.

The logic module 501 is an electric device. The logic module 501 is a programmable electric circuit. The logic module 501 controls the operation of the solenoid valve 502. The logic module 501 monitors the flow volume of the drinking water 106 through the flow meter 503. The logic module 501 controls the flow of the drinking water 106 through the solenoid valve 502 based on the measured flow of drinking water 106 through the flow meter 503. The logic module 501 limits the flow of drinking water 106 to match the flow capacities of the plurality of vessel structures 504. The use of a logic module 501 for the purposes described above are well-known and documented in the electrical arts.

The solenoid valve 502 is an electrically controlled valve. The logic module 501 controls the operation of the solenoid valve 502 by transmitting electric signals to the solenoid valve 502. The logic module 501 adjusts the volume of drinking water 106 flow through the solenoid valve 502 by adjusting the electric signals that are transmitted to the solenoid valve 502. The solenoid valve 502 controls the flow of the drinking water 106 from the distribution pump 450 and the water storage reservoir 430 into the first retractable hose 420. The solenoid valve 502 controls the flow of the drinking water 106 from the distribution pump 450 and the water storage reservoir 430 into the second retractable hose 425. The solenoid valve 502 is defined elsewhere in this disclosure.

The solenoid valve 502 and the flow meter 503 are connected to form a fluid series circuit. The solenoid valve 502 and the flow meter 503 forms a fluidic connection between the distribution pump 450 and the water storage reservoir 430 and the plurality of vessel structures 504.

The flow meter 503 is a sensor. The flow meter 503 is connected in series with the solenoid valve 502 such that the full flow of the drinking water 106 through the solenoid valve 502 flows through the flow meter 503. The flow meter 503 generates an electric signal that is transmitted to the logic module 501. The electric signal transmitted by the flow meter 503 to the logic module 501 is a function of the volume of flow of the drinking water 106 through the flow meter 503 such that the logic module 501 can determine the flow of drinking water 106 through the solenoid valve 502.

The logic module 501 uses the measured flow of drinking water 106 to regulate the flow of drinking water 106 through the solenoid valve 502.

The plurality of vessel structures 504 is a mechanical structure. The plurality of vessel structures 504 forms a vessel from which the drinking water 106 is consumed. The plurality of vessel structures 504 provides a storage space for the vessel from which the drinking water 106 is consumed. The plurality of vessel structures 504 provides a mechanism that refills the vessel with drinking water 106 after it has been consumed. Each of the plurality of vessel structures 504 mounts in the vehicle 900 such that the vessel is accessible to a passenger in the vehicle 900. The plurality of vessel structures 504 further comprises a first vessel 521 structure 511 and a second vessel 531 structure 512.

The first vessel 521 structure 511 is the vessel structure selected from the plurality of vessel structures 504 that replaces the first mouthpiece 410 of the prior disclosure. The first vessel 521 structure 511 further comprises a first vessel 521 and a first vessel 521 holder 522.

The first vessel 521 is a hollow prism-shaped structure. The first vessel 521 is a pan-shaped structure. The first vessel 521 contains the drinking water 106 in a manner suitable for the consumption of the drinking water 106. The open face of the pan structure of the first vessel 521 is formed in a congruent end of the prism structure of the first vessel 521. The first vessel 521 is sized to insert into the first vessel 521 holder 522 for storage. The first vessel 521 structure 511 refills the first vessel 521 with drinking water 106 when the first vessel 521 inserts into the first vessel 521 holder 522. The first vessel 521 further comprises a first vessel 521 valve 523.

The first vessel 521 valve 523 forms a portion of a fitting that attaches the first vessel 521 to the first retractable hose 420 such that the first vessel 521 receives drinking water 106 from the first retractable hose 420. The first vessel 521 valve 523 forms a fluidic connection to the first retractable hose 420 when the first vessel 521 inserts into the first vessel 521 holder 522. The first vessel 521 valve 523 mounts in the closed congruent end of the pan structure of the first vessel 521.

The first vessel 521 holder 522 is a mechanical structure. The first vessel 521 holder 522 mounts in the vehicle 900 such that the first vessel 521 holder 522 and the first vessel 521 are accessible from within the vehicle 900. The first vessel 521 holder 522 stores the first vessel 521. The first vessel 521 holder 522 transfers drinking water 106 from the first retractable hose 420 into the first vessel 521. The first vessel 521 holder 522 further comprises a first vessel 521 holder 522 valve 524 and a first vessel 521 holder 522 pan 525.

The first vessel 521 holder 522 valve 524 forms a portion of a fitting that attaches the first vessel 521 to the first retractable hose 420 such that the first vessel 521 receives drinking water 106 from the first retractable hose 420. The first vessel 521 holder 522 valve 524 attaches to the first retractable hose 420. The first vessel 521 holder 522 valve 524 mounts in the closed congruent end of the pan structure formed by the first vessel 521 holder 522 pan 525 such that the first vessel 521 valve 523 inserts into the first vessel 521 holder 522 valve 524 as the first vessel 521 inserts into the first vessel 521 holder 522 pan 525. The insertion of the first vessel 521 valve 523 into the first vessel 521 holder 522 valve 524 forms the fluidic connection that allows the first retractable hose 420 to refill the first vessel 521 with drinking water 106.

The first vessel 521 holder 522 pan 525 is a prism-shaped negative space that is formed in the first vessel 521 holder 522. The first vessel 521 holder 522 pan 525 has a pan structure. The first vessel 521 holder 522 pan 525 is geometrically similar to the first vessel 521. The inner dimension of the first vessel 521 holder 522 pan 525 is greater than the outer dimension of the first vessel 521 such that the first vessel 521 inserts into the first vessel 521 holder 522 pan 525.

The second vessel 531 structure 512 is the vessel structure selected from the plurality of vessel structures 504 that replaces the second mouthpiece 415 of the prior disclosure. The second vessel 531 structure 512 further comprises a second vessel 531 and a second vessel 531 holder 532.

The second vessel 531 is a hollow prism-shaped structure. The second vessel 531 is a pan-shaped structure. The second vessel 531 contains the drinking water 106 in a manner suitable for the consumption of the drinking water 106. The open face of the pan structure of the second vessel 531 is formed in a congruent end of the prism structure of the second vessel 531. The second vessel 531 is sized to insert into the second vessel 531 holder 532 for storage. The second vessel 531 structure 512 refills the second vessel 531 with drinking water 106 when the second vessel 531 inserts into the second vessel 531 holder 532. The second vessel 531 further comprises a second vessel 531 valve 533.

The second vessel 531 valve 533 forms a portion of a fitting that attaches the second vessel 531 to the second retractable hose 425 such that the second vessel 531 receives drinking water 106 from the second retractable hose 425. The second vessel 531 valve 533 forms a fluidic connection to the second retractable hose 425 when the second vessel 531 inserts into the second vessel 531 holder 532. The second vessel 531 valve 533 mounts in the closed congruent end of the pan structure of the second vessel 531.

The second vessel 531 holder 532 is a mechanical structure. The second vessel 531 holder 532 mounts in the vehicle 900 such that the second vessel 531 holder 532 and the second vessel 531 are accessible from within the vehicle 900. The second vessel 531 holder 532 stores the second vessel 531. The second vessel 531 holder 532 transfers drinking water 106 from the second retractable hose 425 into the second vessel 531. The second vessel 531 holder 532 further comprises a second vessel 531 holder 532 valve 534 and a second vessel 531 holder 532 pan 535.

The second vessel 531 holder 532 valve 534 forms a portion of a fitting that attaches the second vessel 531 to the second retractable hose 425 such that the second vessel 531 receives drinking water 106 from the second retractable hose 425. The second vessel 531 holder 532 valve 534 attaches to the second retractable hose 425. The second vessel 531 holder 532 valve 534 mounts in the closed congruent end of the pan structure formed by the second vessel 531 holder 532 pan 535 such that the second vessel 531 valve 533 inserts into the second vessel 531 holder 532 valve 534 as the second vessel 531 inserts into the second vessel 531 holder 532 pan 535. The insertion of the second vessel 531 valve 533 into the second vessel 531 holder 532 valve 534 forms the fluidic connection that allows the second retractable hose 425 to refill the second vessel 531 with drinking water 106.

The second vessel 531 holder 532 pan 535 is a prism-shaped negative space that is formed in the second vessel 531 holder 532. The second vessel 531 holder 532 pan 535 has a pan structure. The second vessel 531 holder 532 pan 535 is geometrically similar to the second vessel 531. The inner dimension of the second vessel 531 holder 532 pan 535 is greater than the outer dimension of the second vessel 531 such that the second vessel 531 inserts into the second vessel 531 holder 532 pan 535.

The following definitions were used in this disclosure:

Activated Carbon: As used in this disclosure, activated carbon is a form of carbon that is processed in a manner that presents a large surface area for chemical interactions. The surface of activated carbon is used to adsorb chemical contaminants from a fluid flow that is passed through the activated carbon.

Aperture: As used in this disclosure, an aperture is a prism-shaped negative space that is formed completely through a structure or the surface of a structure.

Ball Valve: As used in this disclosure, a ball valve is a type of commercially available check valve.

Battery: As used in this disclosure, a battery is a chemical device consisting of one or more cells, in which chemical energy is converted into electricity and used as a source of power. Batteries are commonly defined with a positive terminal and a negative terminal.

Bed Filter: As used in this disclosure, a bed filter comprises a particulate material through which a fluid is passed such that particulate material captures solids contained within the fluid while allowing the fluid itself to pass through the particulate matter.

Check Valve: As used in this disclosure, a check valve is a valve that permits the flow of fluid in a single direction. Within selected potential embodiments of this disclosure, the check valve is a commercially available product that is selected from the group consisting of a ball valve and a Tesla valve.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Drinking Water: As used in this disclosure, drinking water is water that is deemed safe for drinking or use in cooking by humans. A synonym of drinking water is potable water.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Electrolytic Switch: As used in this disclosure, an electrolytic switch refers to a switching arrangement wherein the electrolytic switch completes the circuit through the immersion of the electrolytic switch in a water based solution.

External Power Source: As used in this disclosure, an external power source is a source of the energy that is externally provided to enable the operation of the present disclosure. Examples of external power sources include, but are not limited to, electrical power sources and compressed air sources.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets)

Filter: As used in this disclosure, a filter is a mechanical device that is used to separate solids that are suspended in a liquid or a gas. A strainer is type of filter with what would be considered a coarse mesh measurement.

Fitting: As used in this disclosure, a fitting is a component that is attached to a first object. The fitting is used to forming a fluidic connection between the first object and a second object.

Float Switch: As used in this disclosure, a float switch is a commercially available switch that is actuated by the level of liquid contained within a contained space. A common use of a float switch is in the operation of a bilge or sump pump. Specifically, when the level of accumulated liquid in a bilge or a sump exceeds a predetermined level, the float switch will actuate into a closed position that completes an electric circuit that provides electrical power to a pump that will remove the liquid from the bilge or sump. When the accumulated liquid falls below the predetermined level the float switch will actuate into an open position discontinuing the operation of the pump.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Series Circuit: As used in this disclosure, a fluid series circuit refers to a method of connecting a plurality of fluid network elements that are connected to form a single fluid transport path from a first point to a second point in a fluid network.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Gas: As used in this disclosure, a gas refers to a state (phase) of matter that is fluid and that fills the volume of the structure that contains it. Stated differently, the volume of a gas always equals the volume of its container.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Inner Dimension: As used in this disclosure, the term inner dimension describes the span from a first inside or interior surface of a container to a second inside or interior surface of a container. The term is used in much the same way that a plumber would refer to the inner diameter of a pipe.

Liquid: As used in this disclosure, a liquid refers to a state (phase) of matter that is fluid and that maintains, for a given pressure, a fixed volume that is independent of the volume of the container.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Motor: As used in this disclosure, a motor refers to the method of transferring energy from an external power source into rotational mechanical energy.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Phase: As used in this disclosure, phase refers to the state of the form of matter. The common states of matter are solid, liquid, gas, and plasma.

Port: As used in this disclosure, a port is an aperture formed in an object that allows fluid to flow through the boundary of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object.

Within this disclosure, a compressor refers to a pump that is dedicated to compressing a fluid or placing a fluid under pressure.

Reservoir: As used in this disclosure, a reservoir refers to a container or containment system that is configured to store a liquid.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Solenoid: As used in this disclosure, a solenoid is a cylindrical coil of electrical wire that generates a magnetic field that can be used to mechanically move a shaft made of a magnetic core.

Solenoid Valve: As used in this disclosure, a solenoid valve is an electromechanically controlled valve that is used to control fluid or gas flow. A two port solenoid valve opens or closes to fluid flow through the valve portion of the solenoid valve. A three port solenoid valve switched fluid or gas flow between a first port and a second port to either feed or be fed from a third port. A solenoid valve comprises a coil and a valve. The coil forms the solenoid that opens and closes the solenoid valve. The solenoid valve is a valve that opens and closes to control the fluid flow.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Surface Filter: As used in this disclosure, a surface filter is a type of filter wherein the fluid is passed through a surface or membrane, such as a screen or paper that allows for the passage of the fluid but blocks the passage of larger particles that may be suspended in the fluid. The construction of a surface filter would allow for the passage of the fluid through several filter surfaces in one filtration unit.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tesla Valve: As used in this disclosure, a Tesla valve is a type of check valve that requires the use of no moving parts.

Tube: As used in this disclosure, a tube is a hollow prism-shaped device formed with two open ends. The tube is used for transporting liquids and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Valve: As used in this disclosure, a valve is a device that is used to control the flow of a fluid (gas or liquid) through a pipe, tube, or hose.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

Figure 5:
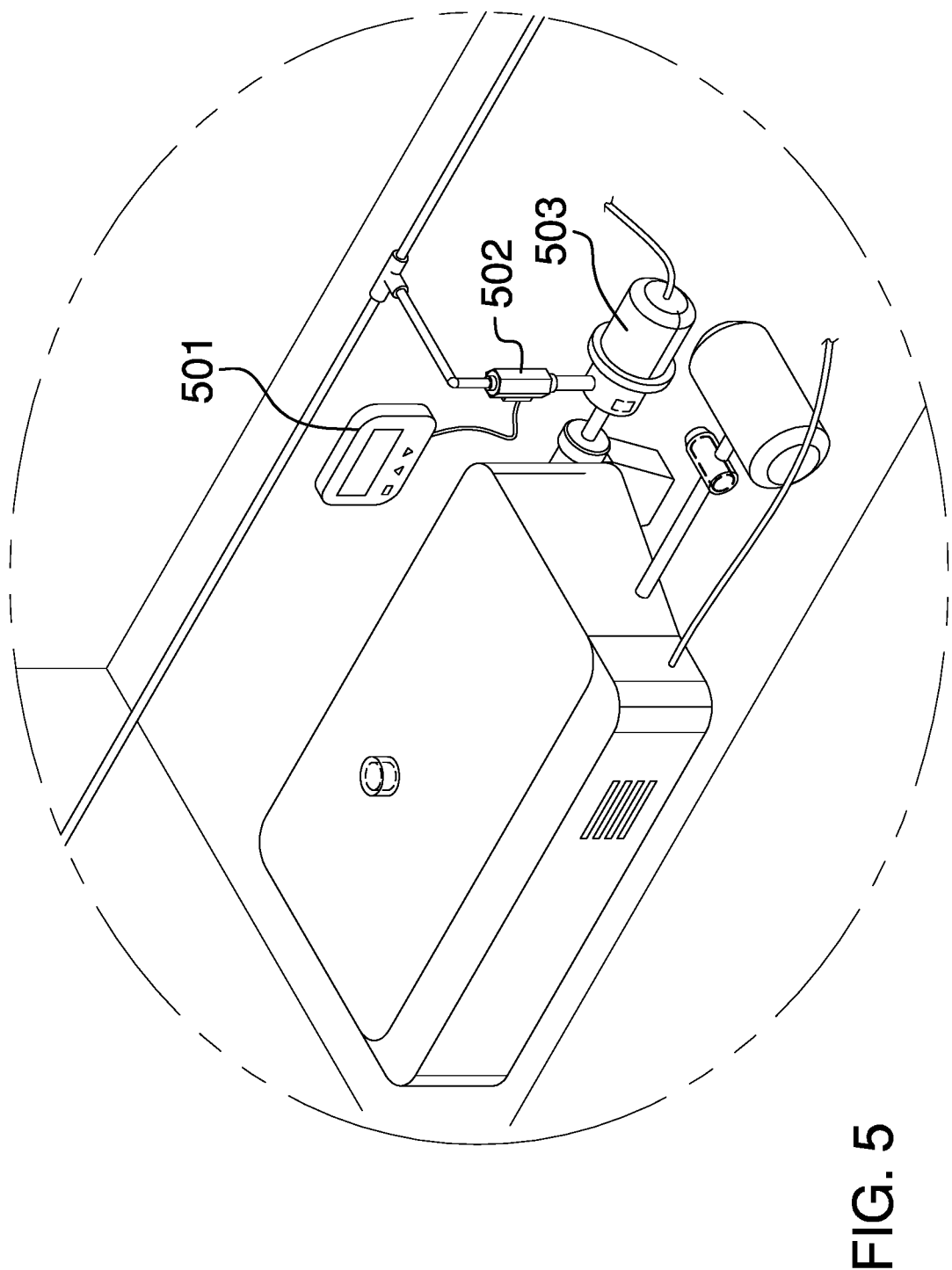
FIG. 5 is a detail view of an embodiment of the disclosure.
Figure 6:
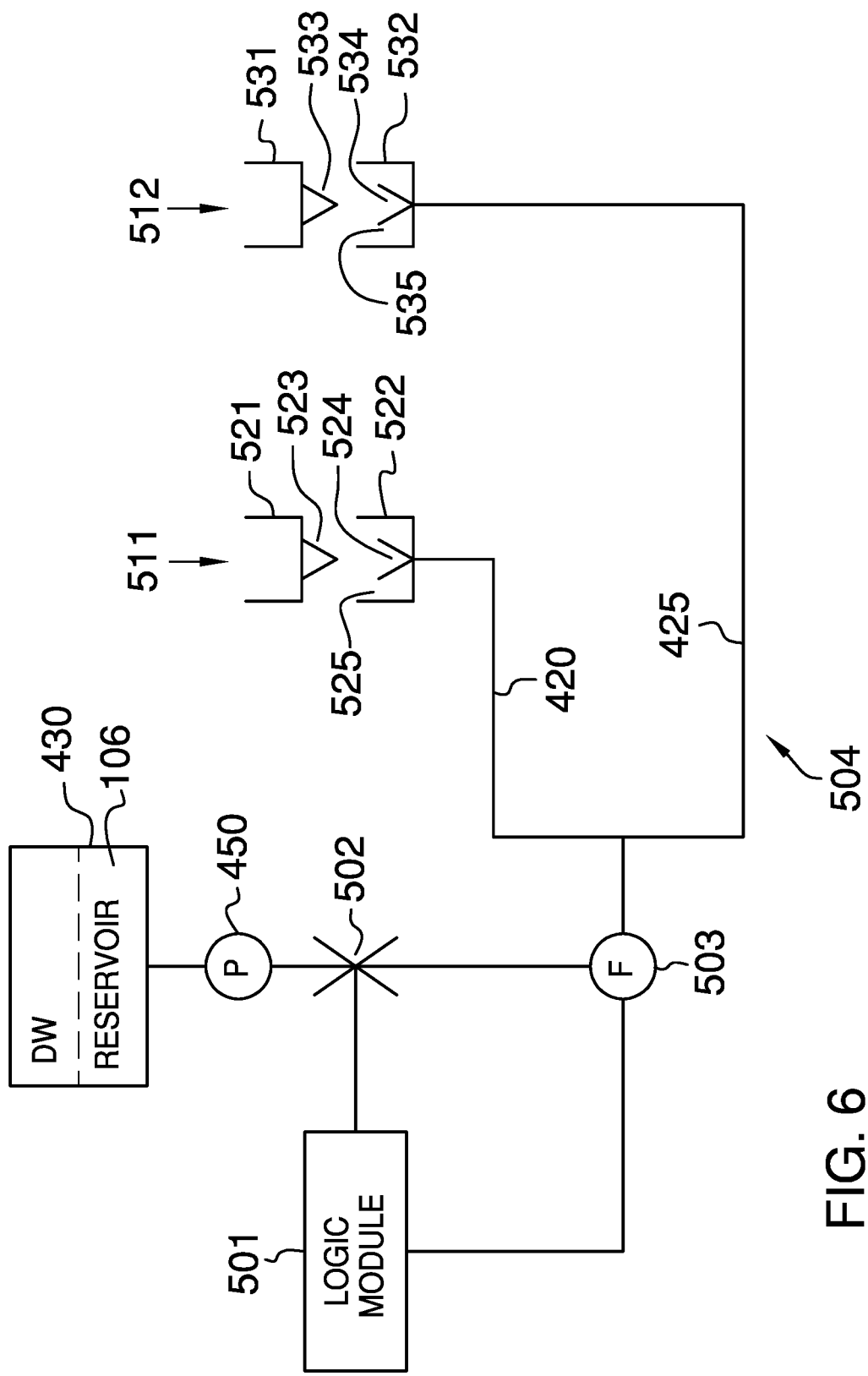
FIG. 6 is a schematic view of an embodiment of the disclosure.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicular water-dispensing system comprising
a water storage reservoir, a distribution pump, a first retractable hose, and a second retractable hose;
wherein the vehicular water-dispensing system further comprises a logic module, a solenoid valve, a flow meter, and a plurality of vessel structures;
wherein the solenoid valve and the logic module control the flow of a drinking water from the water distribution pump and the water storage reservoir to the plurality of vessel structures;
wherein the logic module, the solenoid valve, and the flow meter control the flow of drinking water into the plurality of vessel structures;
wherein the flow meter measures the flow of drinking water discharged from the solenoid valve;
wherein each of the plurality of vessel structures is a mechanical structure that contains the drinking water in preparation for consumption.

2. The vehicular water-dispensing system according to claim 1 wherein the logic module, the solenoid valve, and the flow meter are electrically connected to form a feedback loop that controls the flow of drinking water through the solenoid valve into the plurality of vessel structures.

3. The vehicular water-dispensing system according to claim 2 wherein the plurality of vessel structures automatically refills the drinking water after the drinking water has been consumed.

4. The vehicular water-dispensing system according to claim 3 wherein the logic module, the solenoid valve, and the flow meter are electrically connected.

5. The vehicular water-dispensing system according to claim 4
wherein the logic module is an electric device;
wherein the logic module is a programmable electric circuit;
wherein the logic module controls the operation of the solenoid valve;
wherein the logic module monitors the flow volume of the drinking water through the flow meter;
wherein the logic module controls the flow of the drinking water through the solenoid valve based on the measured flow of drinking water through the flow meter.

6. The vehicular water-dispensing system according to claim 5 wherein the solenoid valve is an electrically controlled valve;

wherein the logic module controls the operation of the solenoid valve by transmitting electric signals to the solenoid valve;

wherein the logic module adjusts the volume of drinking water flow through the solenoid valve by adjusting the electric signals that are transmitted to the solenoid valve.

7. The vehicular water-dispensing system according to claim 6 wherein the solenoid valve controls the flow of the drinking water from the distribution pump and the water storage reservoir into the first retractable hose;

wherein the solenoid valve controls the flow of the drinking water from the distribution pump and the water storage reservoir into the second retractable hose.

8. The vehicular water-dispensing system according to claim 7 wherein the solenoid valve and the flow meter are connected to form a fluid series circuit;

wherein the solenoid valve and the flow meter form a fluidic connection between the distribution pump and the water storage reservoir and the plurality of vessel structures.

9. The vehicular water-dispensing system according to claim 8 wherein the flow meter is a sensor;

wherein the flow meter is connected in series with the solenoid valve such that the full flow of the drinking water through the solenoid valve flows through the flow meter.

10. The vehicular water-dispensing system according to claim 9 wherein the flow meter generates an electric signal that is transmitted to the logic module;

wherein the electric signal transmitted by the flow meter to the logic module is a function of the volume of flow of the drinking water through the flow meter such that the logic module can determine the flow of drinking water through the solenoid valve;

wherein the logic module uses the measured flow of drinking water to regulate the flow of drinking water through the solenoid valve.

11. The vehicular water-dispensing system according to claim 10 wherein the plurality of vessel structures is a mechanical structure;

wherein the plurality of vessel structures forms a vessel from which the drinking water is consumed;

wherein the plurality of vessel structures provides a storage space for the vessel from which the drinking water is consumed;

wherein the plurality of vessel structures provides a mechanism that refills the vessel with drinking water after it has been consumed.

12. The vehicular water-dispensing system according to claim 11 wherein each of the plurality of vessel structures mounts in the vehicle such that the vessel is accessible to a passenger in the vehicle.

13. The vehicular water-dispensing system according to claim 12 wherein the plurality of vessel structures further comprises a first vessel structure and a second vessel structure;

wherein the first vessel structure is the vessel structure selected from the plurality of vessel structures that replaces a first mouthpiece of the vehicular water-dispensing system;

wherein the second vessel structure is the vessel structure selected from the plurality of vessel structures that replaces a second mouthpiece of the vehicular water-dispensing system.

14. The vehicular water-dispensing system according to claim 13 wherein the first vessel structure further comprises a first vessel and a first vessel holder;

wherein the second vessel structure further comprises a second vessel and a second vessel holder;

wherein the first vessel holder stores the first vessel;

wherein the second vessel holder stores the second vessel.

15. The vehicular water-dispensing system according to claim 14 wherein the first vessel is a hollow prism-shaped structure;

wherein the first vessel is a pan-shaped structure;

wherein the first vessel contains the drinking water in a manner suitable for the consumption of the drinking water;

wherein the open face of the pan structure of the first vessel is formed in a congruent end of the prism structure of the first vessel;

wherein the first vessel is sized to insert into the first vessel holder for storage;

wherein the first vessel structure refills the first vessel with drinking water when the first vessel inserts into the first vessel holder.

16. The vehicular water-dispensing system according to claim 15 wherein the second vessel is a hollow prism-shaped structure;

wherein the second vessel is a pan-shaped structure;

wherein the second vessel contains the drinking water in a manner suitable for the consumption of the drinking water;

wherein the open face of the pan structure of the second vessel is formed in a congruent end of the prism structure of the second vessel;

wherein the second vessel is sized to insert into the second vessel holder for storage;

wherein the second vessel structure refills the second vessel with drinking water when the second vessel inserts into the second vessel holder.

17. The vehicular water-dispensing system according to claim 16 wherein the first vessel holder is a mechanical structure;

wherein the first vessel holder mounts in the vehicle such that the first vessel holder and the first vessel are accessible from within the vehicle;

wherein the first vessel holder transfers drinking water from the first retractable hose into the first vessel;

wherein the first vessel holder further comprises a first vessel holder valve and a first vessel holder pan;

wherein the first vessel holder valve forms a portion of a fitting that attaches the first vessel to the first retractable hose such that the first vessel receives drinking water from the first retractable hose;

wherein the first vessel holder valve attaches to the first retractable hose;

wherein the first vessel holder valve mounts in the closed congruent end of the pan structure formed by the first vessel holder pan such that the first vessel valve inserts into the first vessel holder valve as the first vessel inserts into the first vessel holder pan;

wherein the insertion of the first vessel valve into the first vessel holder valve forms the fluidic connection that allows the first retractable hose to refill the first vessel with drinking water;

wherein the first vessel holder pan is a prism-shaped negative space that is formed in the first vessel holder;

wherein the first vessel holder pan has a pan structure;

wherein the first vessel holder pan is geometrically similar to the first vessel;

wherein the inner dimension of the first vessel holder pan is greater than the outer dimension of the first vessel such that the first vessel inserts into the first vessel holder pan.

18. The vehicular water-dispensing system according to claim 17 wherein the second vessel holder is a mechanical structure;

wherein the second vessel holder mounts in the vehicle such that the second vessel holder and the second vessel are accessible from within the vehicle;

wherein the second vessel holder transfers drinking water from the second retractable hose into the second vessel;

wherein the second vessel holder further comprises a second vessel holder valve and a second vessel holder pan;

wherein the second vessel holder valve forms a portion of a fitting that attaches the second vessel to the second retractable hose such that the second vessel receives drinking water from the second retractable hose;

wherein the second vessel holder valve attaches to the second retractable hose;

wherein the second vessel holder valve mounts in the closed congruent end of the pan structure formed by the second vessel holder pan such that the second vessel valve inserts into the second vessel holder valve as the second vessel inserts into the second vessel holder pan;

wherein the insertion of the second vessel valve into the second vessel holder valve forms the fluidic connection that allows the second retractable hose to refill the second vessel with drinking water;

wherein the second vessel holder pan is a prism-shaped negative space that is formed in the second vessel holder;

wherein the second vessel holder pan has a pan structure;

wherein the second vessel holder pan is geometrically similar to the second vessel;

wherein the inner dimension of the second vessel holder pan is greater than the outer dimension of the second vessel such that the second vessel inserts into the second vessel holder pan.

19. The vehicular water-dispensing system according to claim 18 wherein the first vessel further comprises a first vessel valve;

wherein the first vessel valve forms a portion of a fitting that attaches the first vessel to the first retractable hose such that the first vessel receives drinking water from the first retractable hose;

wherein the first vessel valve forms a fluidic connection to the first retractable hose when the first vessel inserts into the first vessel holder;

wherein the first vessel valve mounts in the closed congruent end of the pan structure of the first vessel.

20. The vehicular water-dispensing system according to claim 19 wherein the second vessel further comprises a second vessel valve;

wherein the second vessel valve forms a portion of a fitting that attaches the second vessel to the second retractable hose such that the second vessel receives drinking water from the second retractable hose;

wherein the second vessel valve forms a fluidic connection to the second retractable hose when the second vessel inserts into the second vessel holder;

wherein the second vessel valve mounts in the closed congruent end of the pan structure of the second vessel.

\* \* \* \* \*